(12) United States Patent
Rahman et al.

(10) Patent No.: US 8,565,073 B2
(45) Date of Patent: Oct. 22, 2013

(54) DYNAMIC REROUTING OF DATA PATHS IN A WIRELESS COMMUNICATION NETWORK

(75) Inventors: Moshiur Rahman, Marlboro, NJ (US); Fred Delaplace, Bothell, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 331 days.

(21) Appl. No.: 12/858,539

(22) Filed: Aug. 18, 2010

(65) Prior Publication Data

US 2012/0044804 A1  Feb. 23, 2012

(51) Int. Cl.
*H04W 4/00* (2009.01)
*G06F 11/00* (2006.01)

(52) U.S. Cl.
USPC ............ 370/225; 370/329; 370/338; 370/341

(58) Field of Classification Search
None
See application file for complete search history.

(56) References Cited

U.S. PATENT DOCUMENTS

| | | | | |
|---|---|---|---|---|
| 6,826,146 B1* | 11/2004 | Blenis et al. | ................... | 370/227 |
| 7,187,926 B1* | 3/2007 | Henkel | ........................ | 455/428 |
| 2007/0133403 A1* | 6/2007 | Hepworth et al. | ............ | 370/229 |
| 2008/0253281 A1* | 10/2008 | Li et al. | ......................... | 370/218 |
| 2009/0017824 A1* | 1/2009 | Lee et al. | ...................... | 455/437 |
| 2009/0031183 A1 | 1/2009 | Hoshino et al. | | |
| 2009/0031185 A1 | 1/2009 | Xhafa et al. | | |
| 2009/0147690 A1* | 6/2009 | King | ............................. | 370/245 |
| 2009/0276674 A1 | 11/2009 | Wei et al. | | |
| 2009/0279631 A1 | 11/2009 | Chen et al. | | |
| 2010/0115361 A1 | 5/2010 | Peng et al. | | |
| 2010/0124931 A1* | 5/2010 | Eskicioglu et al. | ........... | 455/440 |
| 2011/0032865 A1* | 2/2011 | Richardson | ................... | 370/316 |
| 2012/0083261 A1* | 4/2012 | Hui et al. | .................... | 455/422.1 |

* cited by examiner

*Primary Examiner* — Chi Pham
*Assistant Examiner* — Soon-Dong D Hyun
(74) *Attorney, Agent, or Firm* — Turocy & Watson, LLP

(57) ABSTRACT

A system and methodology that dynamically reroutes active communications sessions between a user equipment (UE) and a wireless network. In particular, the system can determine a current or impending fault condition and reroute a data path for network traffic to another service. Moreover, the system can identify a failed element in a wireless network and deny access and divert traffic until the element is restored. Further, the system can issue an alert to a user interface of the wireless network with information associated with a fault condition, a failed element, or a restored element.

20 Claims, 16 Drawing Sheets

DYNAMIC REROUTING OF DATA PATHS IN A WIRELESS COMMUNICATION NETWORK

TECHNICAL FIELD

The subject disclosure relates to wireless communications and, more particularly, to fault detection and rerouting services based in part on detected faults.

BACKGROUND

Wireless communication devices, e.g., cellular phones, personal digital assistant, smart phones, and the like, are ubiquitous. Such devices typically connect to a wireless network to send and receive data related to any number of different uses. Data exchange between a wireless communication device and a wireless network typically utilize various protocols to correct errors that occur during the transmission and receiving of wireless signals. One such method is the hybrid automatic repeat request (HARQ) method. The HARQ method involves sending synchronous retransmissions with a feedback message received by the receiving entity from the transmitting entity, and when the feedback message indicates that the data packet has not been received successfully, a retransmission data packet is transmitted to the receiving entity after a predetermined time span. In conventional systems, performance data associated with each exchange of data between a wireless communication device and a wireless network, such as HARQ data, is discarded or ignored after use to enable a successful transmission of data. Although this performance data may be collected, it is not currently utilized to locate failures in a wireless network, nor is it utilized to improve the service that other users of the wireless network experience.

The above-described deficiencies of today's wireless communication networks and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the various embodiments. Its sole purpose is to present some concepts of the disclosed subject matter in a simplified form as a prelude to the more detailed description presented later.

The subject disclosure relates to wireless communications and, more particularly, to fault detection and the rerouting services based in part on the faults detected. The systems and methods disclosed herein, in one aspect hereof, can facilitate dynamically rerouting an active communication session in a wireless network. The techniques can include receiving performance data associated with the active communication session provided by a first user equipment (UE) and the wireless network, comparing the performance data to a predetermined threshold indicative of a current or an impending fault condition; and automatically rerouting a data path for network traffic associated with the active communication session through a femtocell or a satellite link based upon the comparing.

In accordance with another aspect, the systems and methods disclosed herein can facilitate determining a failed element in a wireless network based at least in part upon the performance data. In one aspect, a method that can be employed to facilitate blocking network access to a failed element, identify attempts to access a failed element by a second UE in connection with a second communication session or dynamically reroute the second communication session to the femtocell or the satellite link.

Yet another aspect of the disclosed subject matter relates to systems and methods that can be employed to monitor a failed element and determine whether the failed element is a restored element in which proper operation has been restored. In particular, the system can automatically unblock network access to the restored element or alternatively can automatically reroute a second communication session through the restored element based upon a determination of whether the second communication session is still active.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1A:
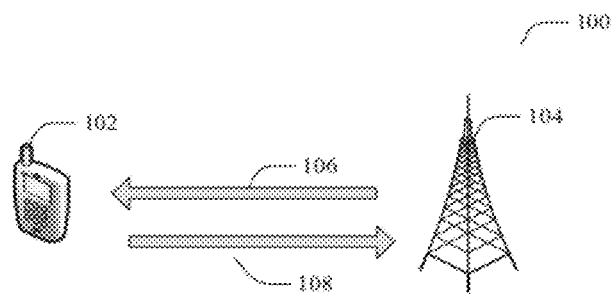
FIG. 1 illustrates an example interaction between a user equipment, a radio network, and a rerouting system in accordance with the subject specification.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. In addition, the terms "femto cell access point", "femtocell" and "femto access point" are also utilized interchangeably.

In addition, it should be appreciated the term "active communication session" can include an exchange of data, control, voice, video, sound, gaming or substantially any data-stream or signaling-stream.

Mobile stations, base stations, radio network controllers and communication systems can perform according to the Hybrid Automatic Repeat Request (HARQ) protocol for transmitting data packets from a transmitting entity to a receiving entity via a data channel. To enable HARQ, a data receiver sends a control signal back to a data transmitter to acknowledge if the data was received successfully or not. Such signals can be a single bit and commonly referred to as acknowledgment/negative acknowledgment (ACK/NACK) signals. In the case the data receiver receives an ACK message, a new packet of data is sent. In the case the data receiver receives a NACK message, the same packet of data is resent to the data receiver. The data receiver saves the previously received packet and combines it with a retransmitted packet to recover the error free packet as efficiently as possible. These ACK/NACK messages are sent over the High Speed Dedicated Physical Control Channel (HS-DPCCH) which also carries the Channel Quality Information (CQI). In this regard, one or more embodiments of the subject disclosure receive such performance data and proactively reroutes UEs accordingly.

Aspects, features, or advantages of the various embodiments can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the various embodiments can be exploited in legacy telecommunication technologies.

Referring now to FIG. 1A, illustrated is an example interaction 100 between a user equipment 102 and Node B 104. Signal 106 can carry downlink messages in addition to carrying other data, wherein the downlink messages can include for example High Speed Downlink Shared Channel (HS-DSCH), High Speed Shared Control Channel (HS-SCCH), or High Speed Physical Downlink Shared Channel (HS-PDSCH). Signal 108 can carry uplink messages in addition to carrying other data, wherein the uplink messages can include for example HS-DPCCH.

Figure 1B:
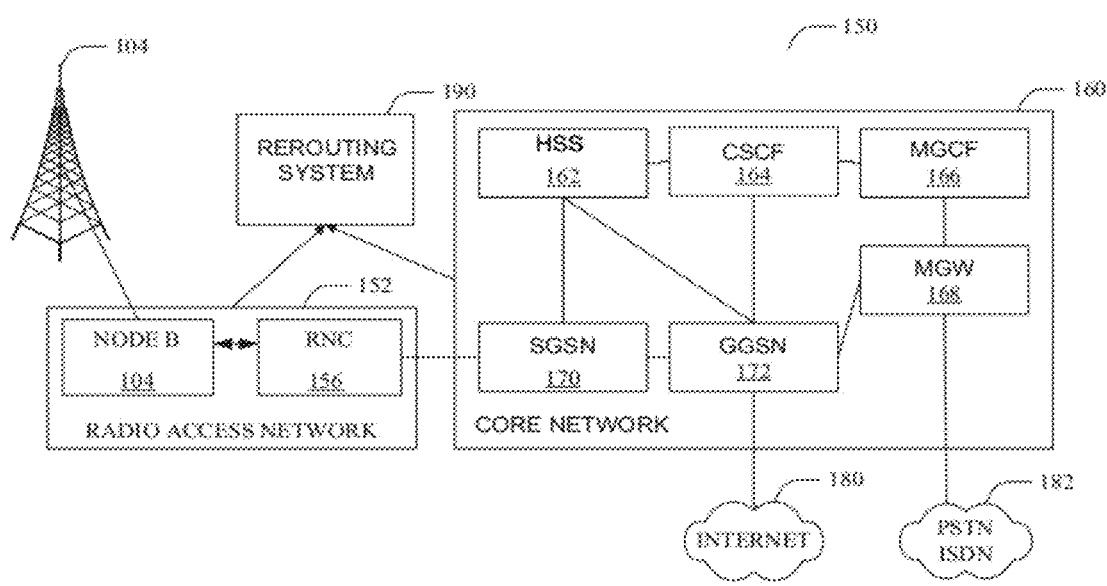

Referring now to FIG. 1B illustrated is an example communications network 150 containing at least a core network 160 and a Radio Access Network (RAN) 152. The RAN 152 contains a plurality of Node B's 104 which serves as cellular access point for UE 102. A Radio Network Controller (RNC) 156 can be integrated with at least one Node B 104 as shown in FIG. 1B. The core network can contain elements well known in wireless communication including a Home Subscriber Service 162, a Call State Control Function 164, a Media Gateway Control Function 166, a Gateway GPRS Support Node 172, a Serving GPRS Support Node 170, and a Media Gateway 168. Outside networks such as the Internet 180 and PSTN/ISDN 182 can also be connected to the core network.

A rerouting system, 190, as is further described in various embodiments in FIGS. 8-13, can be connected to both the RAN 152 and core network 160 to send and receive data to and from each respectively. It is to be appreciated that the rerouting system can send and receive data from any system or component attached to the wireless network including remote systems not physically attached to rerouting system 190. As an example, rerouting system 190 can receive data relating to signal 106 and 108 that are sent and received by a UE 102 and a Node B 104.

Figure 2:
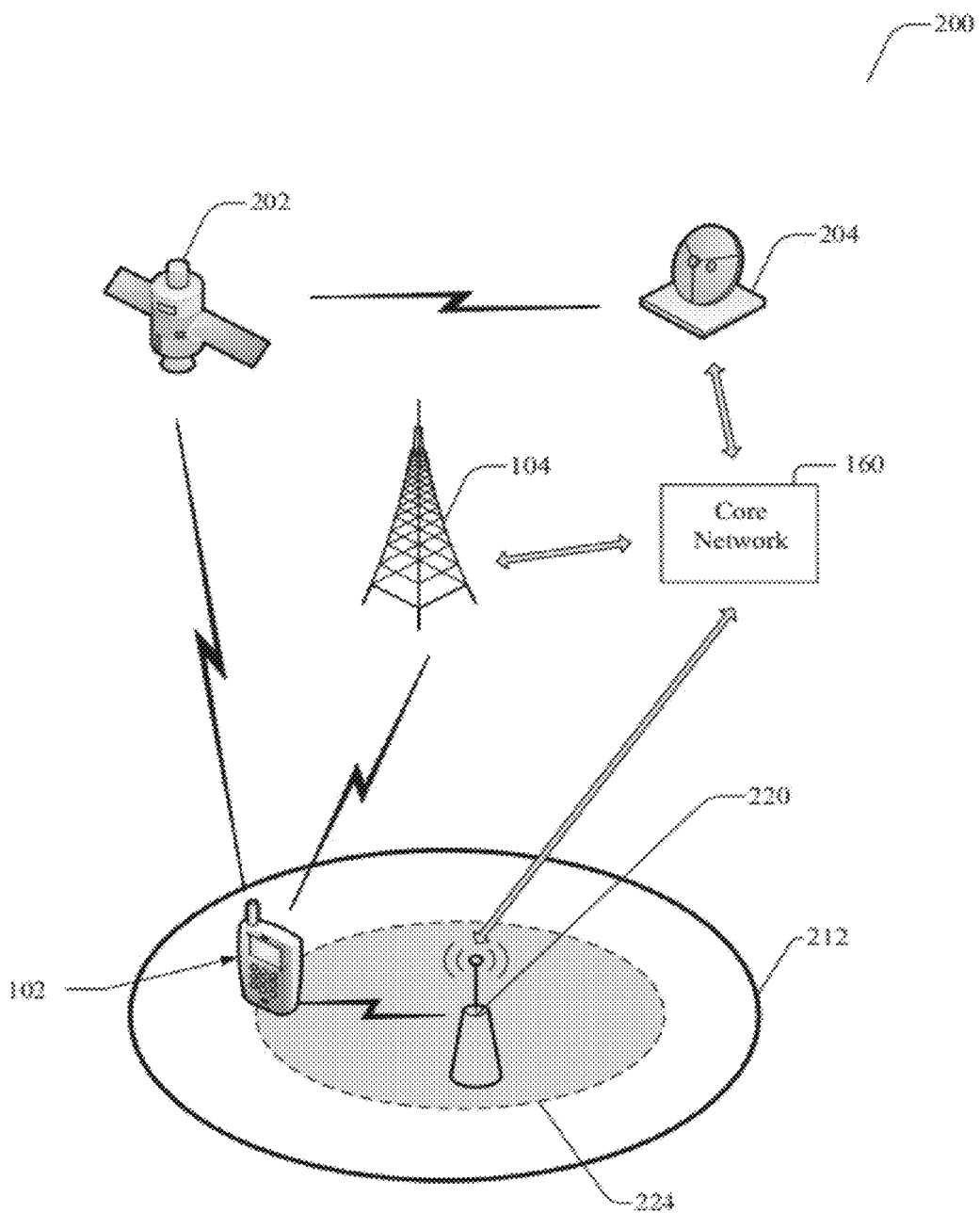
FIG. 2 illustrates an example of a user equipment accessing a core network through alternate data paths for network traffic.

FIG. 2 illustrates an example of a user equipment accessing a core network through alternate data paths for network traffic. In one way, a UE 102 can access a core network 160 to exchange data through macro cell access point Node B 104. If the UE 102 is within Node b coverage area 212, the UE 102 can establish a data path for network traffic with the core network 160 through Node B 104.

In another way, a UE 102 can access a core network 160 to exchange data through a femtocell access point 220. If the UE 102 is within femtocell coverage area 224, the UE 102 can establish a data path for network traffic with the core network 160 through femtocell access point 220.

In still another way, a UE 102 can access a core network 160 through a satellite link 202. A UE can establish a data path for network traffic with the core network 160 through a satellite link 202 and satellite receiver 204.

In one embodiment, the subject system and methods provide for a UE 102 that is accessing a core network 160 through an established data path for network traffic between UE 102 and Node B 104 to be automatically rerouted during an active communication session through for example either a satellite link 202 or femtocell access point 220.

FIGS. 3-7 illustrate methodologies and/or flow diagrams in accordance with the disclosed subject matter. For simplicity of explanation, the methodologies are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 3:
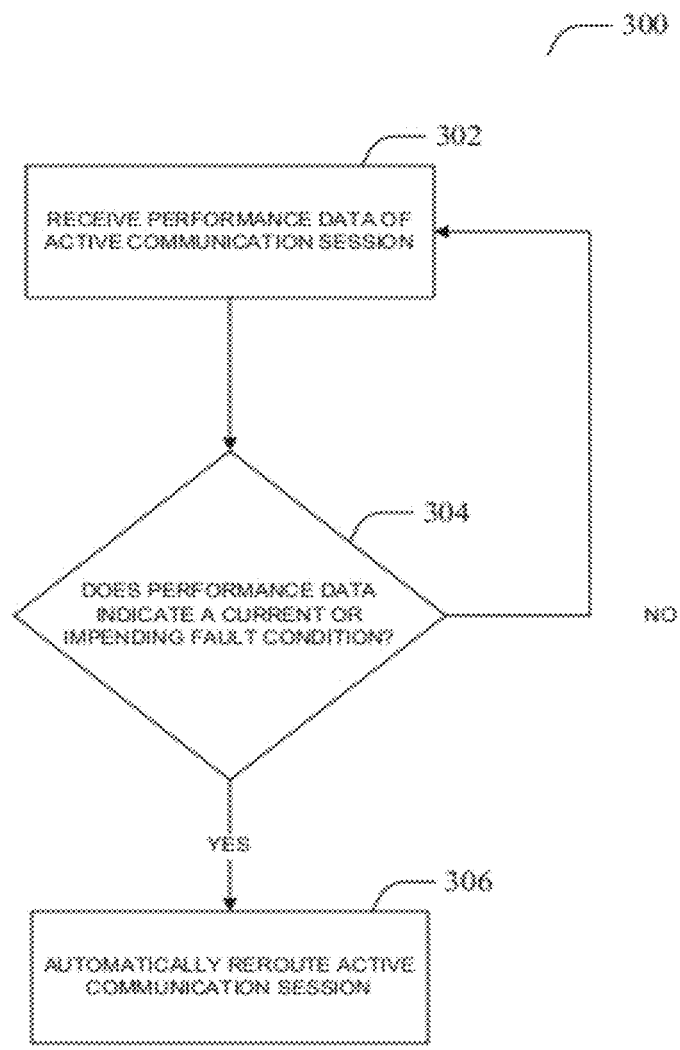
FIG. 3 illustrates an example methodology that can be utilized automatically reroute an active communication session in accordance with the subject specification.

Referring now to FIG. 3, illustrated is an example methodology 100 that can be utilized for dynamically rerouting an active communication session in a wireless network. At 302, performance data can be received relating to an active communication session between a UE and a wireless network. At 304, a current fault condition or an impending fault condition can be detected by comparing the performance data to a predetermined threshold indicative of a current or impending fault condition. In one aspect, if the performance data does not indicate a current or an impending fault condition, additional performance data related to the active communication is received and compared to a predetermined threshold indicative of a current or impending fault condition.

In another aspect, if the performance data does indicate a current or an impending fault condition at 306, a data path for network traffic associated with the active communication session can be automatically rerouted through another service, such as a femtocell, a satellite link, another in range macro cell, another service provider's network, etc. It is to be appreciated that upon indication of a current or impending fault condition, the data path for network traffic could be rerouted through any service available to both the service provider and the UE.

Figure 4:
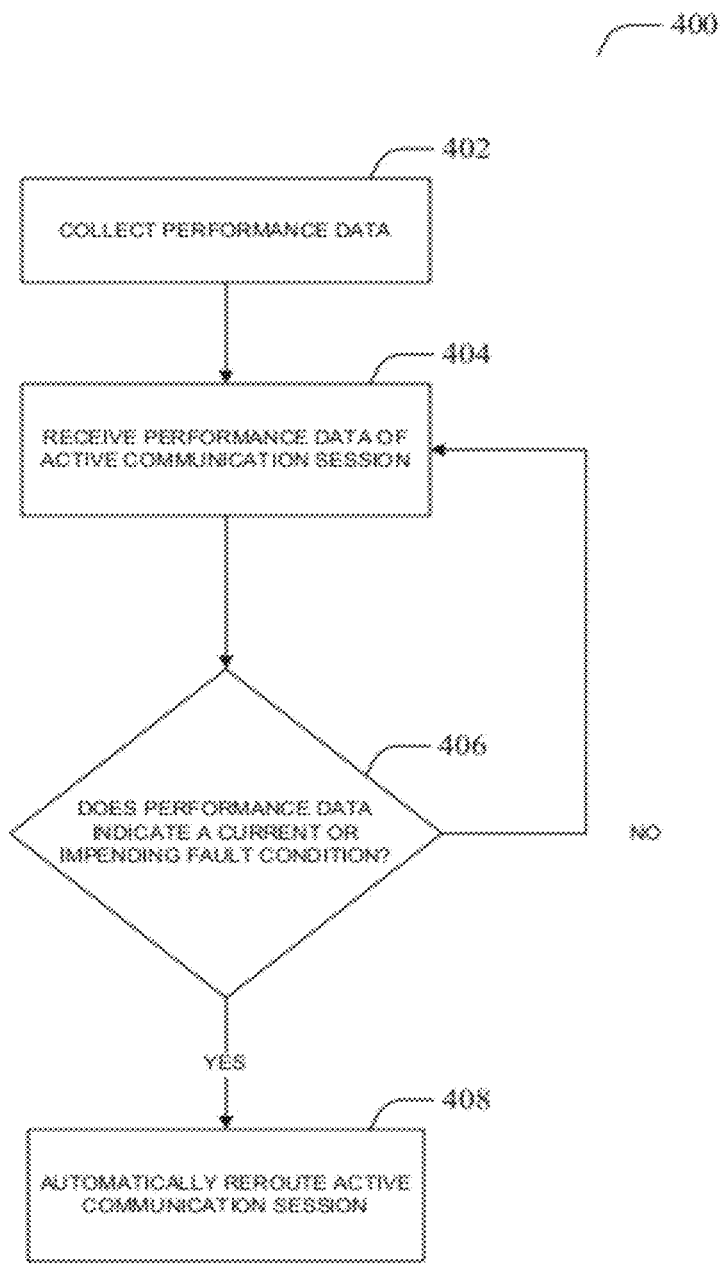
FIG. 4 illustrates an example methodology that can be utilized to collect performance data associated with an active communication session and automatically reroute an active communication session in accordance with the subject specification.

Referring now to FIG. 4, illustrated is an example methodology 400 that can be utilized to collect performance data associated with an active communication session. At 402, performance data can be collected. The performance data can include, but is not limited to, HARQ protocol data, HS-DPCCH data, CQI data, packet loss, delay, latency between network elements, historical data, or any data associated with a UE's interaction with a wireless network. At 404, performance data can be received relating to an active communication session between a UE and a wireless network. At 406, a current fault condition or an impending fault condition can be detected by comparing the performance data to a predetermined threshold indicative of a current or impending fault condition. At 408, a data path for network traffic associated with the active communication session can be automatically rerouted through another service such as a femtocell, a satellite link, another in range macro cell, another service provider's network, etc.

Figure 5:
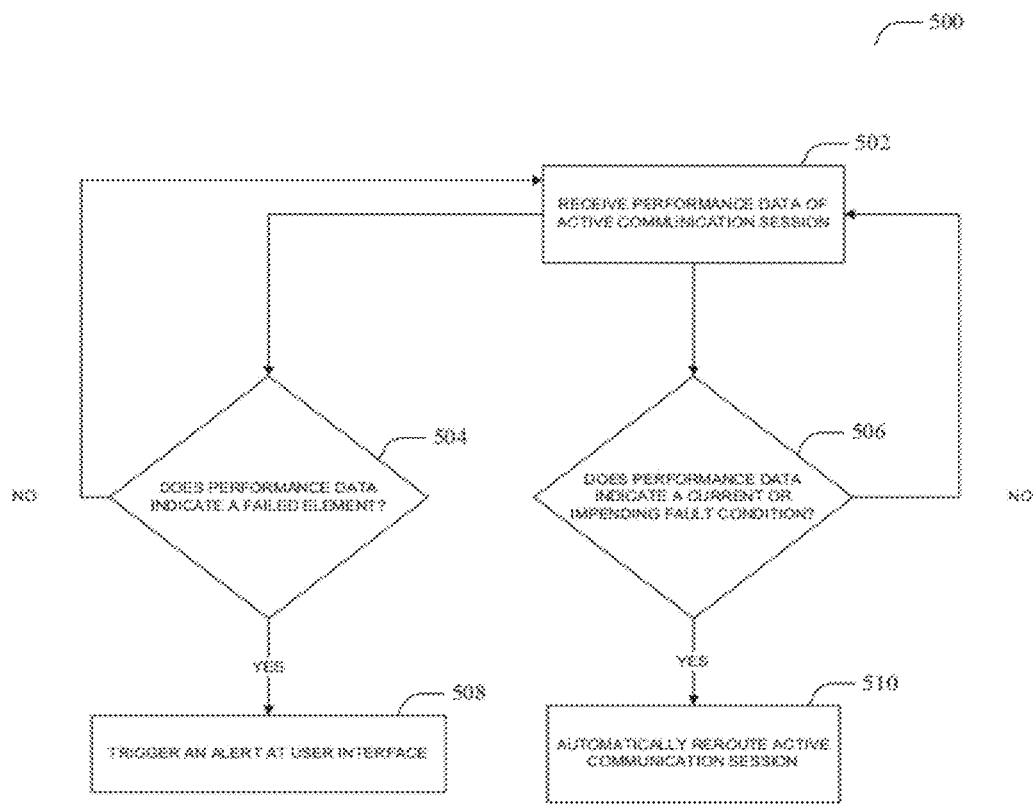
FIG. 5 illustrates an example methodology that can be utilized to identify a failed element in a wireless network and trigger an alert at a user interface in accordance with the subject specification.

Referring now to FIG. 5, illustrated is an example methodology 500 that can be utilized to identify a failed element in a wireless network and can trigger an alert at a user interface. At 502, performance data can be received relating to an active communication session between a UE and a wireless network. At 504, it can be determined if a failed element is present in the wireless network based at least in part upon the performance data.

In another aspect, if the performance data does indicate a failed element in the network at 508, an alert can be triggered at a user interface of the wireless network. Such alert can include, but is not limited to, identity of the failed element, location of the failed element, necessary steps to restore the failed element to proper its proper function, estimated time to restore the failed element, etc. In another aspect, if the performance data does indicate a current or an impending fault condition, at 506, a data path for network traffic associated with the active communication session can be automatically rerouted at 510 through another service such as a femtocell, a satellite link, another in range macro cell, another service provider's network, etc.

Figure 6:
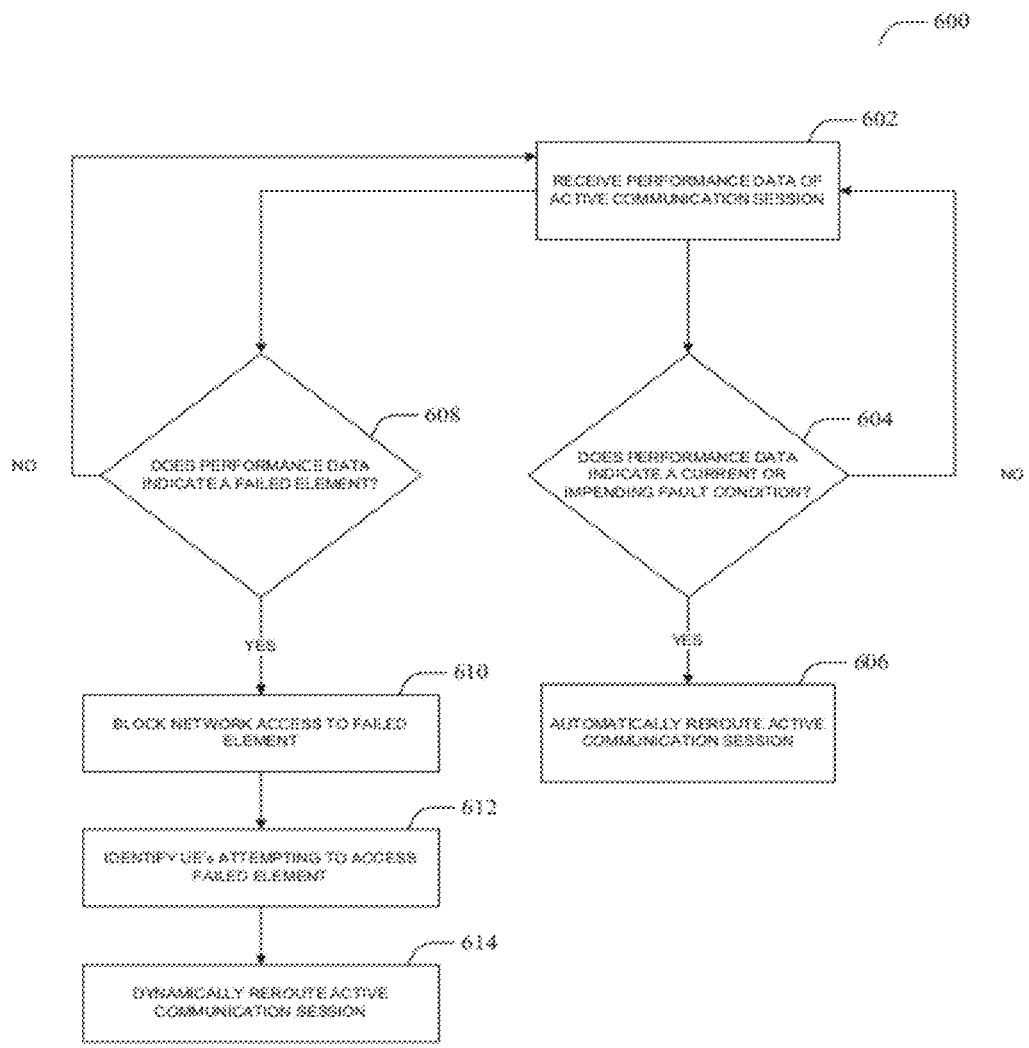
FIG. 6 illustrates an example methodology that can be utilized to identify a failed element in a wireless network and block access to the failed element in accordance with the subject specification.

Referring now to FIG. 6, illustrated is an example methodology 600 that can be utilized to identify a failed element in a wireless network and block access to the failed element. At 602, performance data can be received relating to an active communication session between a UE and a wireless network. If the performance data does indicate a current or an impending fault condition, at 604, a data path for network traffic associated with the active communication session can be automatically rerouted at 606 through another service such as a femtocell, a satellite link, another in range macro cell, another service provider's network, etc.

In another aspect, at 608, it can be determined if a failed element is present in the wireless network based at least in part upon the performance data. In still another aspect, if the performance data does indicate a failed element in the network, at 610, the methodology provides for blocking access to the failed element. Alternatively, if the performance data does indicate a failed element in the network, at 612, the methodology provides for identifying attempts to access the failed element by additional UEs. In another aspect, if the performance data does indicate a failed element in the network, at 614, the methodology can dynamically reroute additional UEs attempting to connect to the failed element through another service such as a femtocell, a satellite link, another in range macro cell, another service provider's network, etc.

Figure 7:
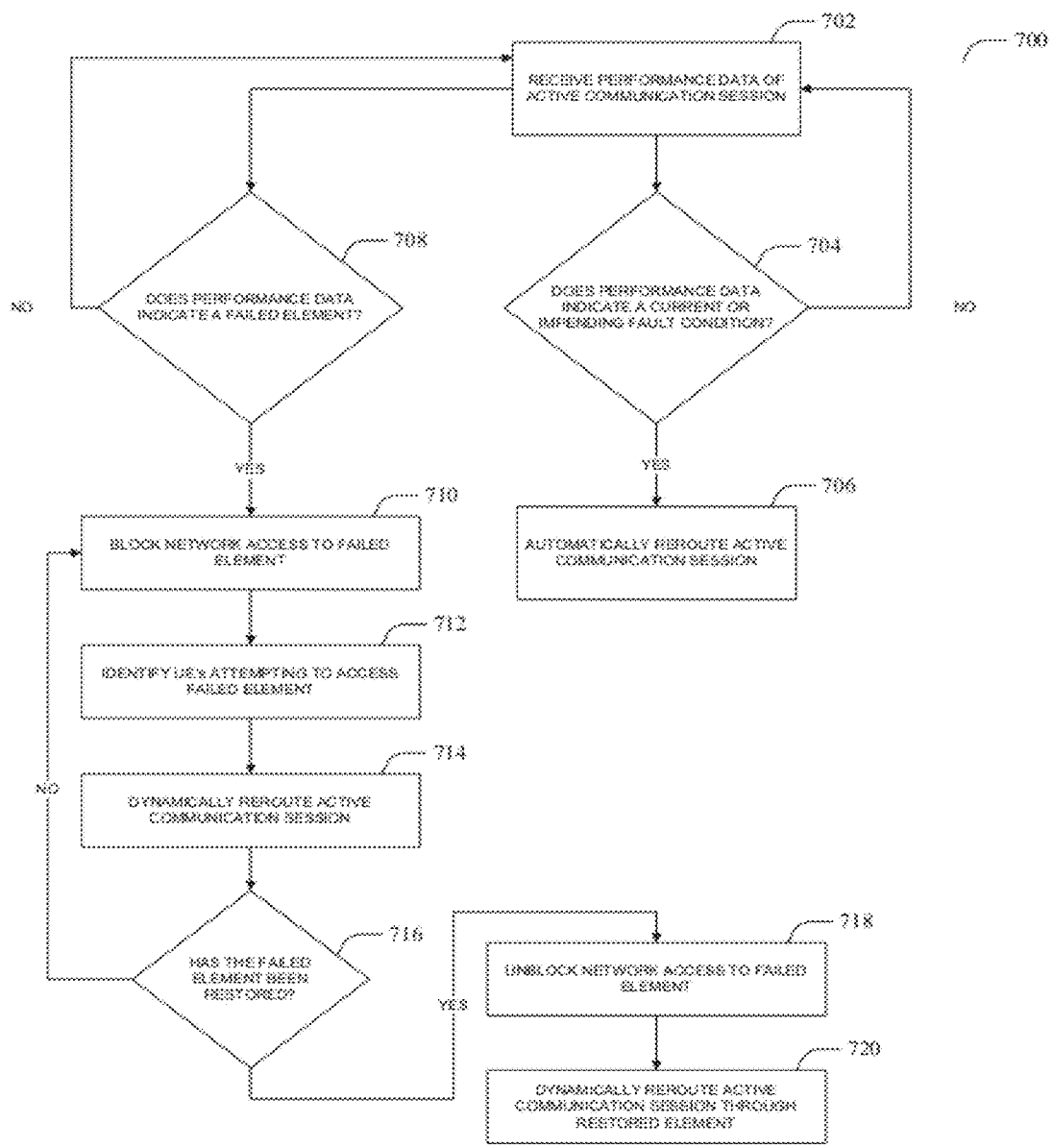
FIG. 7 illustrates an example methodology that can be utilized to identify a restored element and unblock access to the restored element in accordance with the subject specification.

Referring now to FIG. 7, illustrated is an example methodology 700 that can be utilized to identify a restored element and unblock access to the restored element. At 702, performance data can be received relating to an active communication session between a UE and a wireless network. If the performance data does indicate a current or an impending fault condition, at 704, a data path for network traffic associated with the active communication session can be automatically rerouted at 706 through another service such as a femtocell, a satellite link, another in range macro cell, another service provider's network, etc.

In another aspect, at 708 it can be determined if a failed element is present in the wireless network based at least in part upon the performance data. In still another aspect, if the performance data does indicate a failed element in the network, at 710, the methodology provides for blocking access to the failed element. Alternatively, if the performance data does indicate a failed element in the network, at 712, the methodology provides for identifying attempts to access the failed element by additional UEs. In another aspect, if the performance data does indicate a failed element in the network, at 714, the methodology can dynamically reroute additional UEs attempting to connect to the failed element through another service such as a femtocell, a satellite link, another in range macro cell, another service provider's network, etc.

In another aspect, at 716, it can be determined if a failed element has been restored to proper operation. If it is determined that a failed element has been restored, the example methodology can, at 718, unblock network access to the failed element. Additionally, if it is determined that a failed element has been restored, the methodology can, at 720, automatically reroute an active communication session of a UE through the restored element.

Figure 8:
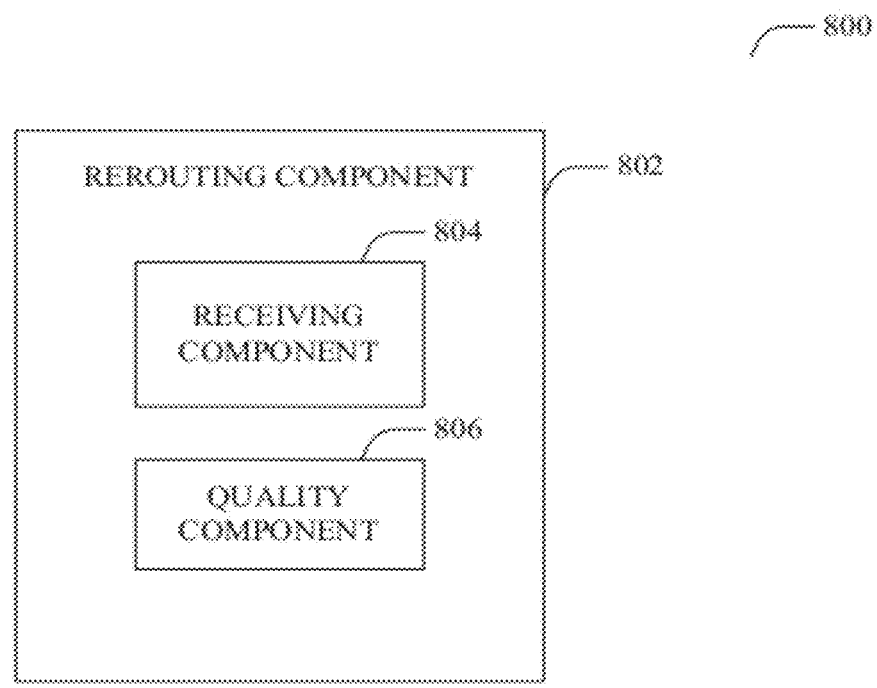
FIG. 8 illustrates an example system that can be employed to automatically reroute an active communication session in accordance with the subject specification.

Referring now to FIG. 8, illustrated is an example system 800 that can be employed to automatically reroute an active communication session in a wireless network. The system can utilize a receiving component 804 that receives performance data associated with an active communication session provided by a UE and the wireless network. The performance data can include, but is not limited to, HARQ protocol data, HS-DPCCH data, CQI data, packet loss, delay, latency between network elements, historical data, or any data associated with a UE's interaction with a wireless network. The system can further utilize a quality component 806 that compares the performance data to a predetermined threshold and detects a current or impending fault condition. A rerouting component 802 can then utilize the detection of a current or impending fault made by the quality component 806 to automatically reroute a data path for network traffic associated with the active communication sessions through another service such as a femtocell, a satellite link, another in range macro cell, another service provider's network, etc.

Figure 9:
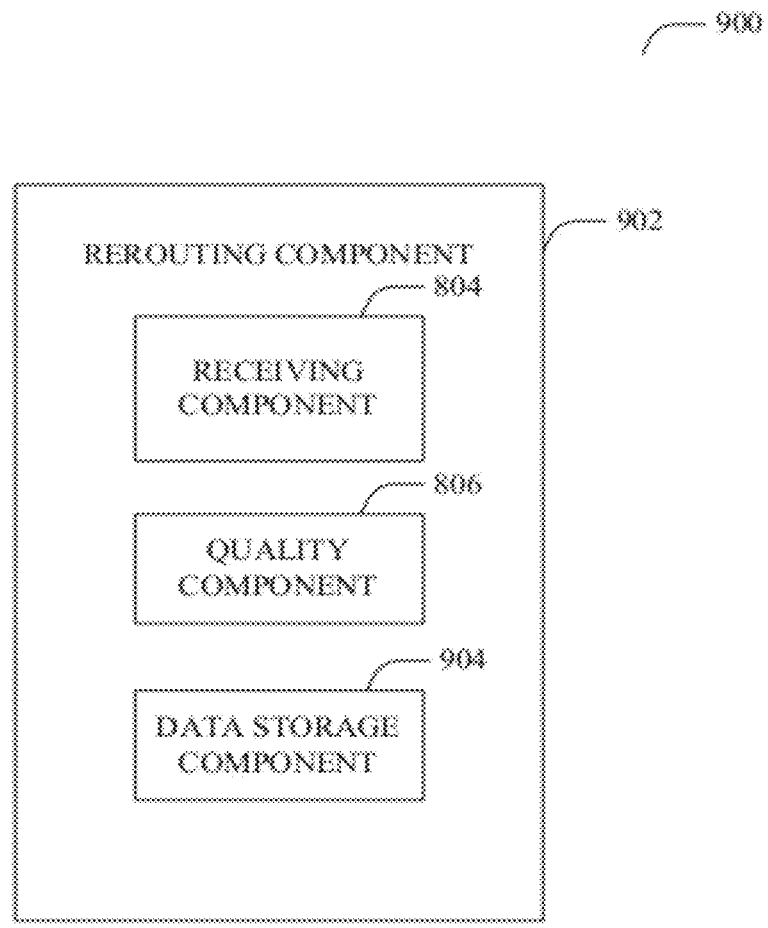
FIG. 9 illustrates an example system that can be employed to automatically reroute an active communication session including a data storage component in accordance with the subject specification.

Referring now to FIG. 9, an example system 900 that can be employed to automatically reroute an active communication session that includes a data storage component. It can be appreciated that the receiving component 804 and quality component 806 can include functionality, as more fully described herein, with regard to system 800. In another aspect, the system can include a data storage component 904 that can store performance data received by the receiving component on any available computer storage medium. Further, although the data storage component is illustrated to reside within the rerouting component 902 as depicted in FIG. 7 it can be appreciated that the data storage component 904 can also be locally or remotely connected to rerouting component 902. A rerouting component 902 can then utilize the detection of a current or impending fault made by the quality component 906 to automatically reroute a data path for network traffic associated with the active communication sessions through another service such as a femtocell, a satellite link, another in range macro cell, another service provider's network, etc.

Figure 10:
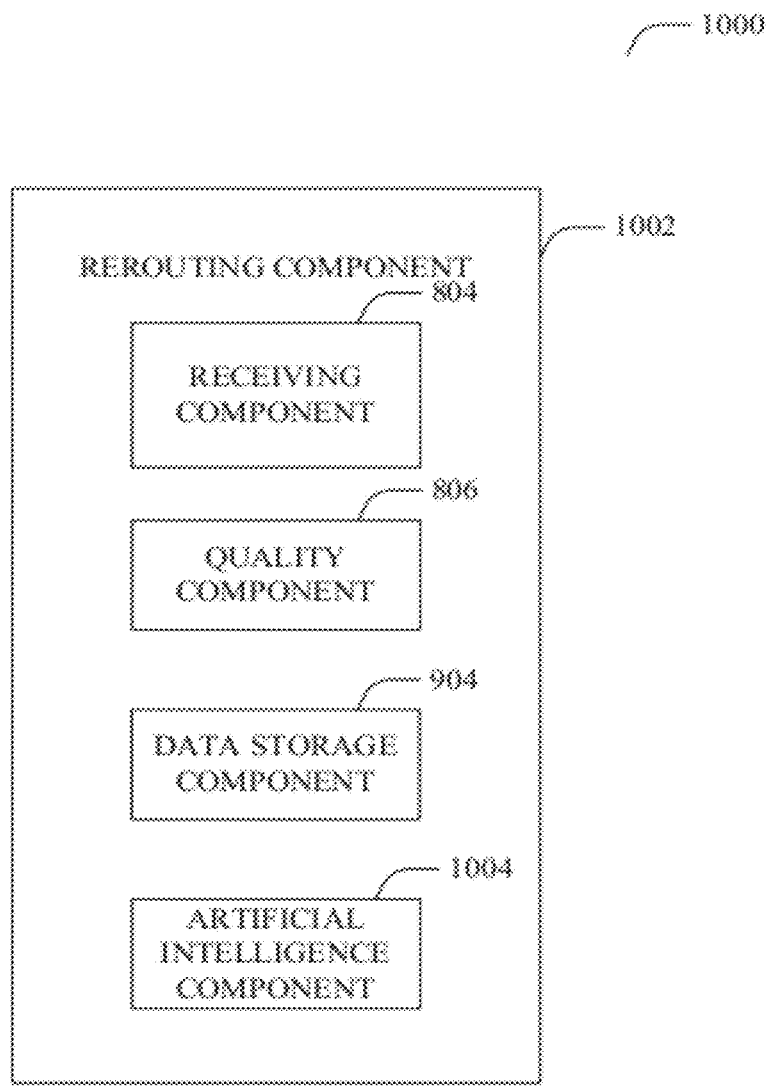
FIG. 10 illustrates an example system that can be employed to automatically reroute an active communication session including a artificial intelligence component in accordance with the subject specification.

Referring now to FIG. 10, an example system 1000 that can be employed to automatically reroute an active communication session including an artificial intelligence (AI) component 1004, which facilitates the automating one or more features in accordance with the various embodiments. It can be appreciated that the receiving component 804, quality component 806, and data storage component 904 can include respective functionality, as more fully described herein, for example, with regard to systems 800 and 900. Further, although the AI component 804 is illustrated to reside within the rerouting component 1002, it can be appreciated that the AI component 1004 can also be locally or remotely connected to the rerouting component 1002. The various embodiments (e.g., in connection with fault detection and automatic rerouting) can employ various AI-based schemes for carrying out various aspects thereof. For example, a process for determining a current or impending fault condition based on performance data stored in a data storage component 904 can be facilitated via an automatic classifier system and process.

A classifier is a function that maps an input attribute vector, x=(x1, x2, x3, x4, xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. In the case of wireless communication systems, for example, attributes can be derived from content requests and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining a threshold indicative of a current or impending fault condition, determining a threshold indicative of a failed element, determining a threshold indicative of a restored element, etc. The criteria can include, but is not limited to, performance data, resource demands, historical patterns, UE behavior, user preferences, network element behavior, service provider preferences and/or policies, location of the UE, network status, traffic conditions on core network-to-base station link, etc.

Figure 11:
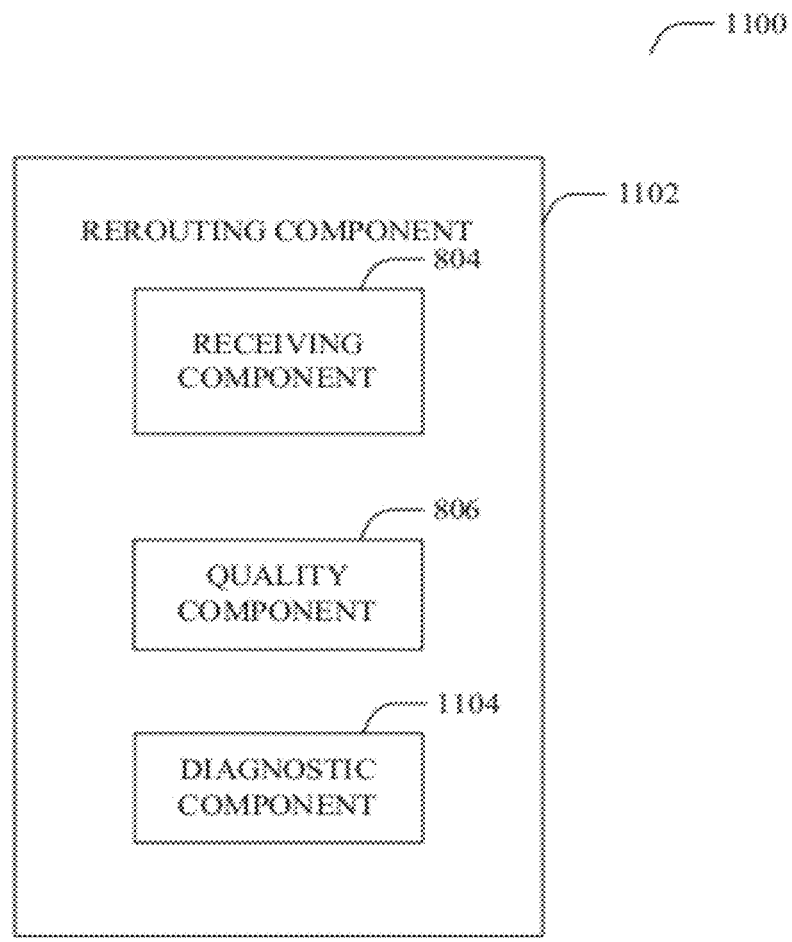
FIG. 11 illustrates an example system that can be employed to automatically reroute an active communication session including a diagnostic component in accordance with the subject specification.

Referring now to FIG. 11, illustrated is an example system 1100 that can be employed to automatically reroute an active communication session including a diagnostic component 1104. It can be appreciated that the receiving component 804 and quality component 806 can include functionality, as more fully described herein, with regard to system 800. The system can further utilize the diagnostic component 1104 to determine whether a failed element is present within the wireless network. The diagnostic component 1104 may receive performance data from the receiving component 804 and may use such performance data in its analysis. In another embodiment, the diagnostic component 1104 can block network access to a failed element in the wireless network. Blocking access can include blocking other network elements in the wireless network from accessing such failed element or blocking access to UE's attempting to access the failed element. In another embodiment, the diagnostic component 1104 can dynamically reroute a UE that is attempting to access a failed element through another service such as a femtocell, a satellite link, another in range macro cell, another service provider's network, etc.

Figure 12:
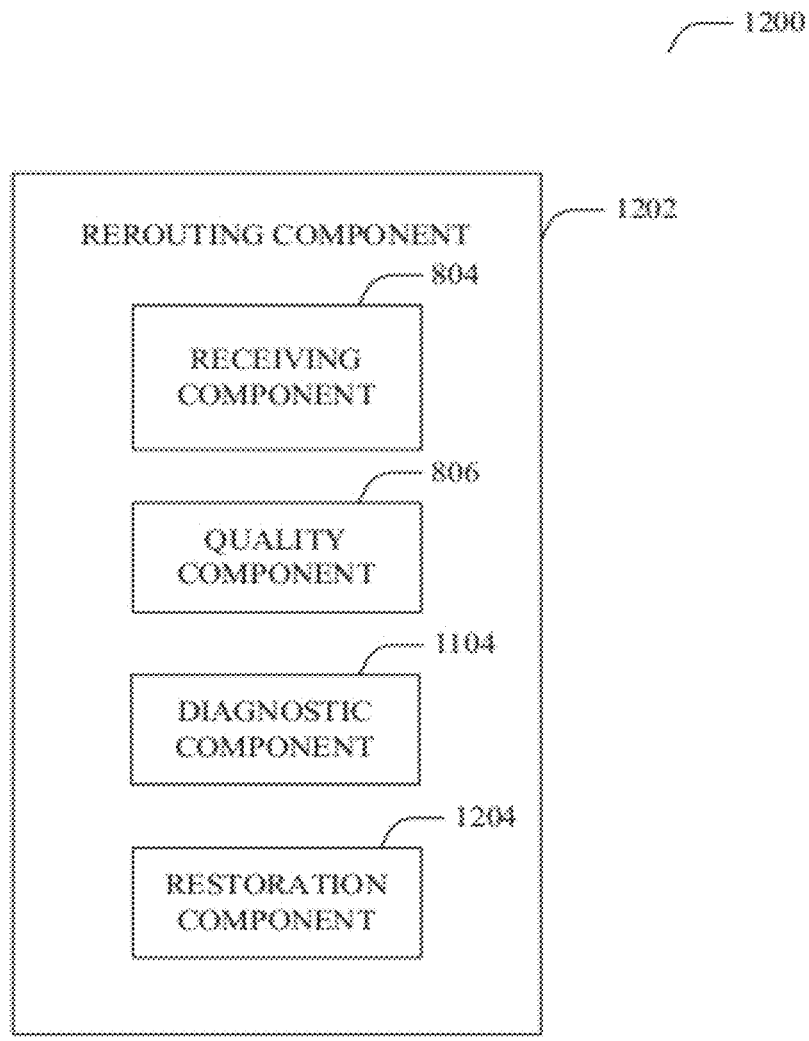
FIG. 12 illustrates an example system that can be employed to automatically reroute an active communication session including a restoration component in accordance with the subject specification.

Referring now to FIG. 12, illustrated is an example system 1200 that can be employed to automatically reroute an active communication session including a restoration component 1204. It can be appreciated that the receiving component 804, quality component 806, and diagnostic component 1104 can include functionality, as more fully described herein, with regard to systems 800 and 1100. The restoration component 1204 can monitor a failed element of the wireless network and determine whether the failed element becomes a restored element in which proper operation has been restored. In another embodiment, the restoration component 1204 can automatically unblock network access to a restored element. In still another embodiment, the restoration component 1204 can automatically reroute a UE through the restored element based in part on whether an active communication session is in progress.

Figure 13:
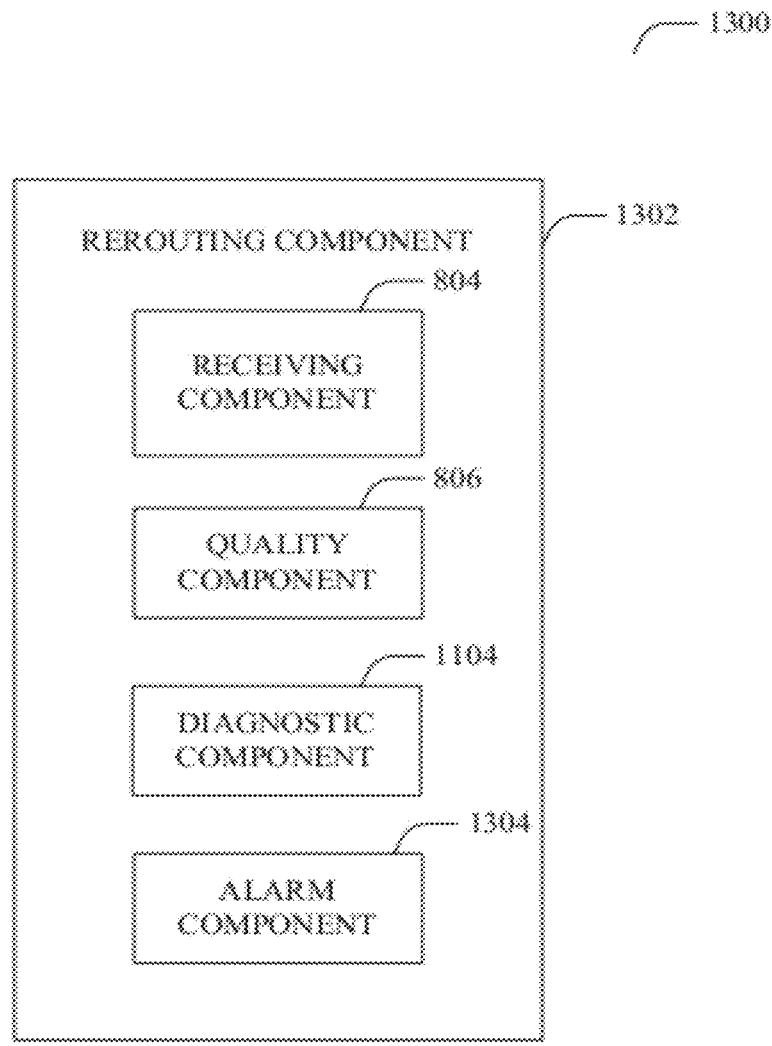
FIG. 13 illustrates an example system that can be employed to automatically reroute an active communication session including an alarm component in accordance with the subject specification.

Referring now to FIG. 13, illustrated is an example system 1300 that can be employed to automatically reroute an active communication session including an alarm component 1304. It can be appreciated that the receiving component 804, quality component 806, and diagnostic component 1104 can include functionality, as more fully described herein, with regard to systems 800 and 1100. The alarm component 1304 can trigger an alert on a user interface of the wireless network upon the determination of a failed element. Such an alert can include, but is not limited to, identity of the failed element, location of the failed element, necessary steps to restore the failed element to proper its proper function, estimated time to restore the failed element, etc.

Figure 14:
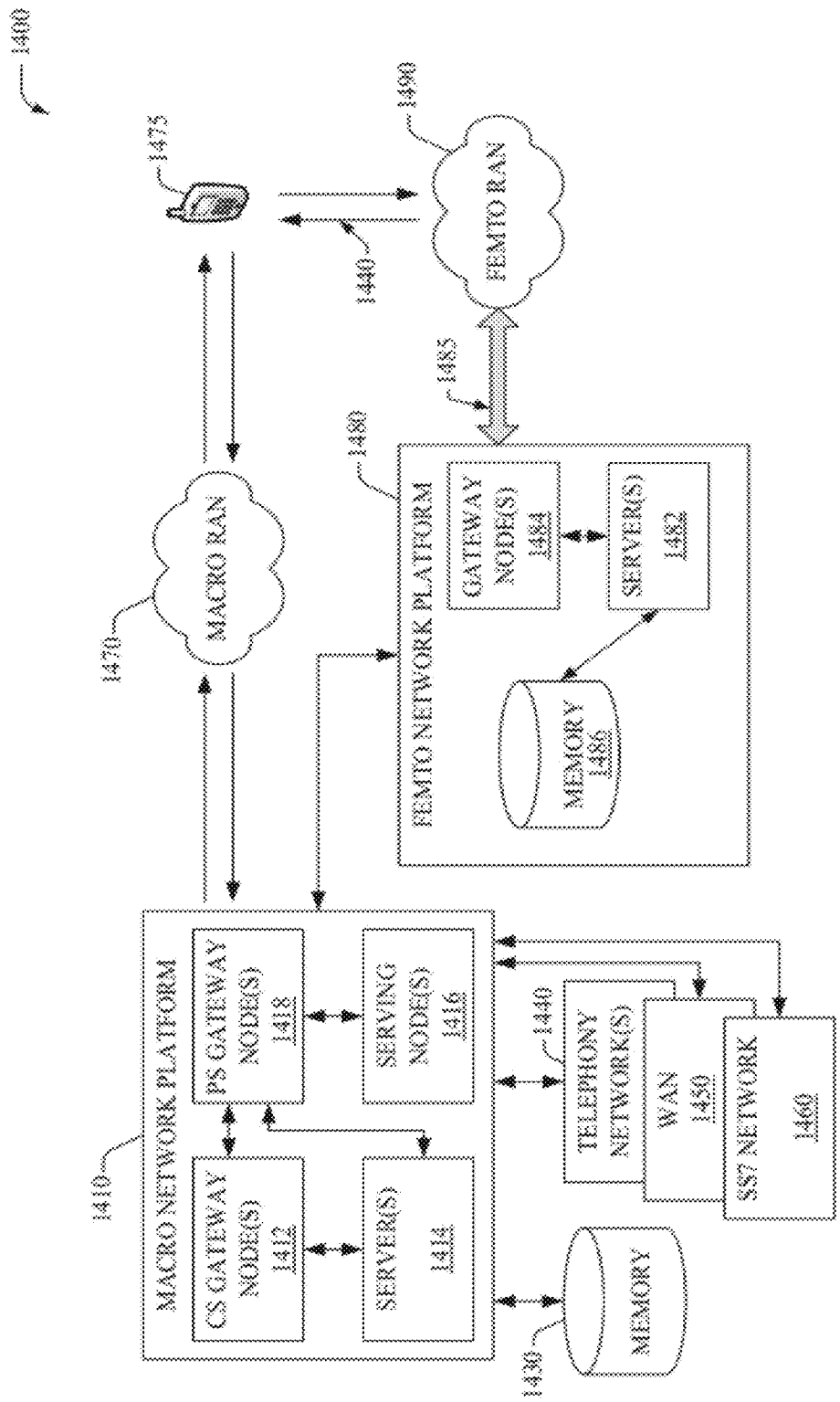
FIG. 14 illustrates a schematic deployment of a macro cell and a femtocell for wireless coverage in accordance with aspects of the specification.
Figure 15:
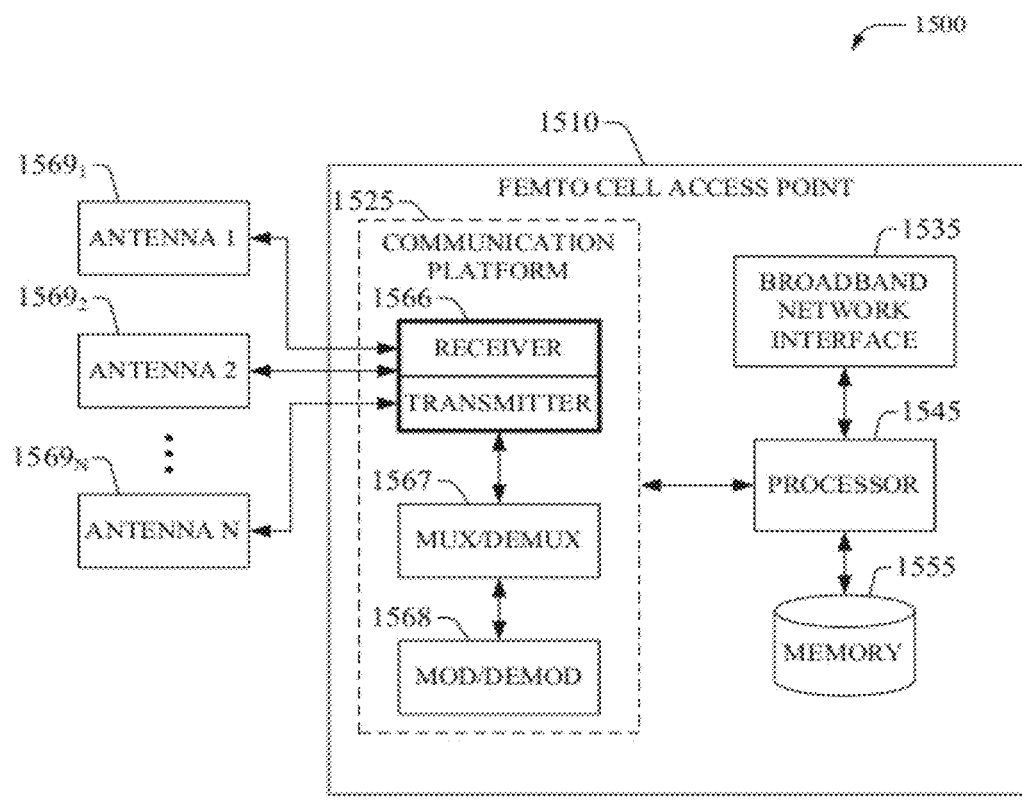
FIG. 15 illustrates an example embodiment of a femto access point that active communication sessions can be rerouted to according to subject specification.

To provide further context for various aspects of the subject specification, FIGS. 14 and 15 illustrate, respectively, an example wireless communication environment 1400, with associated components for operation of a femtocell, and a block diagram of an example embodiment 1500 of a femto access point which can facilitate rerouting of communication sessions in accordance with aspects described herein.

Wireless communication environment 1400 includes two wireless network platforms: (i) A macro network platform 1410 that serves, or facilitates communication) with user equipment 1475 via a macro radio access network (RAN) 1470. It should be appreciated that in cellular wireless technologies (e.g., 3GPP UMTS, HSPA, 3GPP LTE, 3GPP UMB), macro network platform 1410 is embodied in a Core Network. (ii) A femto network platform 1480, which can provide communication with UE 1475 through a femto RAN 1490 linked to the femto network platform 1480 via backhaul pipe(s) 1485. It should be appreciated that femto network platform 1480 typically offloads UE 1475 from macro network, once UE 1475 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 1470 can comprise various coverage cells, while femto RAN 1490 can comprise multiple femtocell access points. It is to be appreciated that deployment density in femto RAN 1490 is substantially higher than in macro RAN 1470.

Generally, both macro and femto network platforms 1410 and 1480 include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1410 includes CS gateway node(s) 1412 which can interface CS traffic received from legacy networks like telephony network(s) 1440 (e.g., public switched telephone network (PSTN), or public land mobile network (PLMN)) or a SS7 network 1460. Moreover, CS gateway node(s) 1412 interfaces CS-based traffic and signaling and gateway node(s) 1418.

In addition to receiving and processing CS-switched traffic and signaling, gateway node(s) 1418 can authorize and authenticate PS-based data sessions with served (e.g., through macro RAN) wireless devices. Data sessions can include traffic exchange with networks external to the macro network platform 1410, like wide area network(s) (WANs) 1450; it should be appreciated that local area network(s) (LANs) can also be interfaced with macro network platform 1410 through gateway node(s) 1418. Gateway node(s) 1418 generates packet data contexts when a data session is established. It should be further appreciated that the packetized communication can include multiple flows that can be generated through server(s) 1414. Macro network platform 1410 also includes serving node(s) 1416 that convey the various packetized flows of information, or data streams, received through gateway node(s) 1418. It is to be noted that server(s) 1414 can include one or more processor configured to confer at least in part the functionality of macro network platform 1410. To that end, the one or more processor can execute code instructions stored in memory 1430, for example.

In example wireless environment 1400, memory 1430 stores information related to operation of macro network platform 1410. Information can include business data associated with subscribers; market plans and strategies, e.g., promotional campaigns, business partnerships; operational data for mobile devices served through macro network platform; service and privacy policies; end-user service logs for law enforcement; and so forth. Memory 1430 can also store information from at least one of telephony network(s) 1440, WAN(s) 1450, or SS7 network 1460.

Femto gateway node(s) 1484 have substantially the same functionality as PS gateway node(s) 1418. Additionally, femto gateway node(s) 1484 can also include substantially all functionality of serving node(s) 1416. In an aspect, femto gateway node(s) 1484 facilitates handover resolution, e.g., assessment and execution. Server(s) 1482 have substantially the same functionality as described in connection with server(s) 1414 and can include one or more processor configured to confer at least in part the functionality of macro network platform 1410. To that end, the one or more processor can execute code instructions stored in memory 1486, for example.

Memory 1486 can include information relevant to operation of the various components of femto network platform 1480. For example operational information that can be stored in memory 1486 can comprise, but is not limited to, subscriber information; contracted services; maintenance and service records; femtocell configuration (e.g., devices served through femto RAN 1490; access control lists, or white lists); service policies and specifications; privacy policies; add-on features; and so forth.

With respect to FIG. 15, in example embodiment 1500, femtocell AP 1510 can receive and transmit signal(s) (e.g., traffic and control signals) from and to wireless devices, access terminals, wireless ports and routers, etc., through a set of antennas 15691-1569N. It should be appreciated that while antennas 15691-1569N are a part of communication platform 1525, which comprises electronic components and associated circuitry that provides for processing and manipulating of received signal(s) (e.g., a packet flow) and signal(s) (e.g., a broadcast control channel) to be transmitted. In an aspect, communication platform 1525 includes a transmitter/receiver (e.g., a transceiver) 1566 that can convert signal(s) from analog format to digital format upon reception, and from digital format to analog format upon transmission. In addition, receiver/transmitter 1566 can divide a single data stream into multiple, parallel data streams, or perform the reciprocal operation. Coupled to transceiver 1566 is a multiplexer/demultiplexer 1567 that facilitates manipulation of signal in time and frequency space. Electronic component 1567 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1567 can scramble and spread information (e.g., codes) according to substantially any code known in the art; e.g., Hadamard-Walsh codes, Baker codes, Kasami codes, polyphase codes, and so on. A modulator/demodulator 1568 is also a part of operational group 1525, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1510 also includes a processor 1545 configured to confer functionality, at least partially, to substantially any electronic component in the femto access point 1510, in accordance with aspects of the various embodiments. In particular, processor 1545 can facilitate femto AP 1510 to implement configuration instructions received through communication platform 1525, which can include storing data in memory 1555. In addition, processor 1545 facilitates femto AP 1510 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1545 can manipulate antennas 15691-1569N to facilitate beamforming or selective radiation pattern formation, which can benefit specific locations (e.g., basement, home office . . . ) covered by femto AP; and exploit substantially any other advantages associated with smart-antenna technology. Memory 1555 can store data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1555 can store configuration information such as schedules and policies; femto AP address(es) or geographical indicator(s); access lists (e.g., white lists); license(s) for utilization of add-features for femto AP 1510, and so forth.

In embodiment 1500, processor 1545 is coupled to the memory 1555 in order to store and retrieve information necessary to operate and/or confer functionality to communication platform 1525, broadband network interface 1535 (e.g., a broadband modem), and other operational components (e.g., multimode chipset(s), power supply sources . . . ; not shown) that support femto access point 1510. The femto AP 1510 can further include a macro cell domain determination component 202, preferred domain selection component 102, preferred domain transmission component 204 and preferred domain utilization component 104, which can include respective functionality, as more fully described herein, for example, with regard to systems 100, 200, 300, 400, and 600.

In addition, it is to be noted that the various aspects disclosed in the subject specification can also be implemented through (i) program modules stored in a computer-readable storage medium or memory (e.g., memory 1486 or memory 1555) and executed by a processor (e.g., processor 1545), or (ii) other combination(s) of hardware and software, or hardware and firmware.

Figure 16:
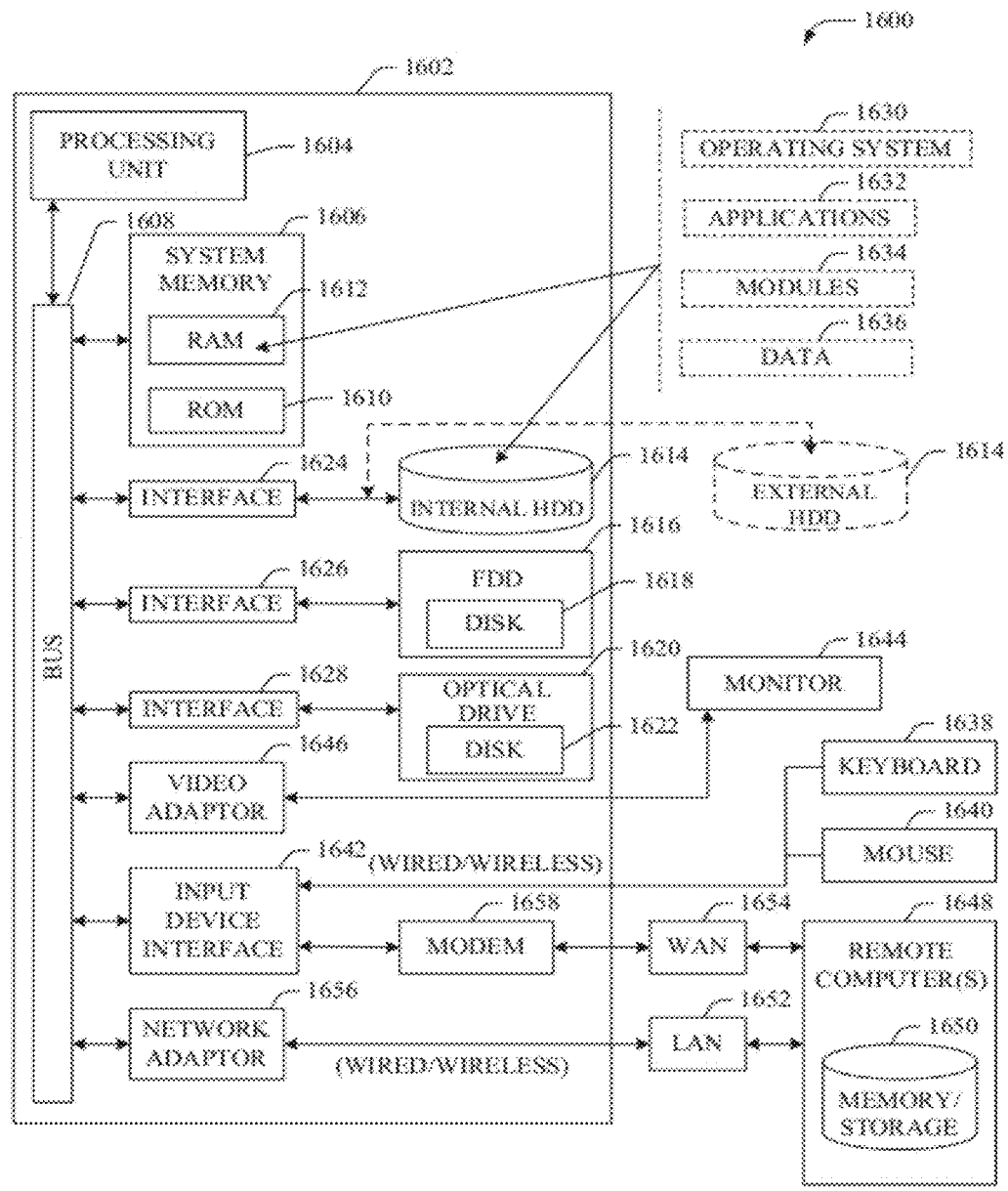
FIG. 16 illustrates a block diagram of a computer operable to execute the disclosed communication architecture.

With reference again to FIG. 16, the example environment 1600 for implementing various aspects of the specification includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 can also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the specification can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) can include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1394 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 is connected to the local network 1652 through a wired and/or wireless communication network interface or adapter 1656. The adapter 1656 can facilitate wired or wireless communication to the LAN 1652, which can also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are example and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.)

to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a system comprising a processor, performance data associated with a first communication session between a first user equipment and a wireless network comprising a set of network devices;
determining, by the system, a network device in the set of network devices that has failed based on a comparison of the performance data to a defined threshold indicative of a fault condition;
identifying, by the system, an attempt to access the network device by a second user equipment in connection with a second communication session between the second user equipment and the wireless network; and
rerouting, by the system, first network traffic associated with the first communication session and second network traffic associated with the second communication session through a femtocell or a satellite link comprising rerouting the first network traffic and the second network traffic to avoid the network device that has failed.

2. The method according to claim 1, further comprising collecting, by the system, the performance data based on a hybrid automatic repeat request protocol.

3. The method according to claim 1, further comprising facilitating, by the system, transmission of an alert to a provider device associated with a provider of the wireless network, wherein the alert includes an identification of the network device that has failed.

4. The method according to claim 1, further comprising:
blocking access to the network device that has failed.

5. The method according to claim 4, further comprising:
monitoring the network device that has failed comprising determining the fault condition associated with the network device no longer exists;
in response to the determining the fault condition no longer exists, unblocking the access to the network device; and
rerouting the first network traffic and the second network traffic through the network device for which the fault condition is determined to no longer exist based upon a determination of whether the first communication session or the second communication session remain active.

6. A system, comprising:
a memory to store instructions; and
a processor, coupled to the memory, that facilitates execution of the instructions to perform operations, comprising:
receiving performance data associated with a first communication session between a first user equipment and a plurality of network devices of a wireless network;
determining that a network device of the plurality of network devices is in a fault state based on a comparison between the performance data and a threshold value associated with the fault state;
detecting an attempted use of the network device that is in the fault state by a second communication session between a second user equipment and the plurality of network devices of the wireless network; and
rerouting network traffic associated with the first communication session or the second communication session through an alternate network device of the plurality of network devices that is of a different device type than a device type of the network device.

7. The system of claim 6, wherein the operations further comprise storing the performance data associated with the plurality of network devices of the wireless network to a data structure.

8. The system of claim 7, wherein the operations further comprise determining the threshold value based on the performance data stored in the data structure.

9. The system of claim 6, wherein the performance data includes hybrid automatic repeat request protocol data.

10. The system of claim 6, wherein the operations further comprise facilitating blocking access to the network device that is in the fault state.

11. The system of claim 10, wherein the operations further comprise:
monitoring the network device that is in the fault state;
determining that the network device has been restored to an operational state;
facilitating unblocking the access to the network device that is in the operational state; and
rerouting the network traffic through the network device that is in the operational state based upon a determination that the first communication session or the second communication session is active.

12. The system of claim 6, wherein the operations further comprise initiating rendering of an alert on an interface of the wireless network in response to a determination that the network element is in the fault state.

13. The system of claim 6, wherein the alternate network device is a femtocell device associated with the wireless network.

14. The system of claim 6, wherein the alternate network device is a satellite device of the wireless network.

15. A computer-readable storage device storing computer executable instructions that, in response to execution cause a system comprising a processor to perform operations, comprising:
receiving performance data associated with a first communication session between a first user equipment and a set of network devices of a wireless network;
determining a network device of the set of network devices is in a fault state based on an outcome of comparing the performance data to a threshold associated with a fault condition;
identifying a second communication session between a second user equipment and the set of network devices of the wireless network that attempts to utilize the network device in the fault state; and
rerouting network transmissions associated with the first communication session or the second communication session through an access point device of the wireless network, wherein the access point device is of a different device type than the network device that is in the fault condition.

16. The computer readable storage device of claim 15, wherein the operations further comprise collecting performance data based on hybrid automatic repeat request protocol data.

17. The computer readable storage device of claim 15, wherein the operations further comprise facilitating triggering an alert to be sent to a user interface of the set of network devices of the wireless network identifying the network device that is in the fault state.

18. The computer readable storage device of claim 15, wherein the operations further comprise:
blocking access to the network device that is in the fault state.

19. The computer readable storage device of claim 18, wherein the operations further comprise:
determining that the network device has been restored to an operational status;
facilitating unblocking the access to the network device that has an operational status, based on the determining; and
rerouting the network transmissions of the first communication session or the second communication session through the network device that has an operational status based on respective determinations that the first communication session or the second communication session are still active.

20. The computer readable storage device of claim 15, wherein the alternate access point device is a satellite device or a femtocell device.

* * * * *